United States Patent [19]
Kiel et al.

[11] Patent Number: 5,700,063
[45] Date of Patent: Dec. 23, 1997

[54] PRESSURE MEDIUM ACTUATED VEHICLE BRAKING SYSTEM

[75] Inventors: Bernd Kiel, Wunstorf; Karl-Heinz Unser, Muggensturm, both of Germany

[73] Assignees: Wabco GmbH, Hanover; Mercedes-Benz AG, Stuttgart, both of Germany

[21] Appl. No.: 596,833

[22] Filed: Feb. 5, 1996

[30] Foreign Application Priority Data

Feb. 10, 1995 [DE] Germany ............... 195 04 393.6

[51] Int. Cl.⁶ .................................................. B60T 13/00
[52] U.S. Cl. .......................... 303/961; 303/57; 303/64; 303/85
[58] Field of Search ............... 303/9, 7, 9.61, 303/3, 15, 13, 64, 57, 85

[56] References Cited

U.S. PATENT DOCUMENTS

| | | | |
|---|---|---|---|
| 4,003,605 | 1/1977 | Fannin | 303/9 X |
| 4,258,959 | 3/1981 | Knight et al. | 303/9 X |
| 4,673,222 | 6/1987 | Knight | 303/9 |
| 4,949,492 | 8/1990 | Samuelson et al. | 303/15 X |
| 5,255,961 | 10/1993 | Graham | 303/9 X |

FOREIGN PATENT DOCUMENTS

| | | |
|---|---|---|
| 0 079 543 | 11/1986 | European Pat. Off. |
| 27 38 948 A1 | 3/1979 | Germany . |
| 29 31 100 | 2/1980 | Germany . |
| 32 04 185 A1 | 8/1983 | Germany . |
| 32 30 970 A1 | 2/1984 | Germany . |
| 35 44 965 A1 | 6/1987 | Germany . |
| 35 45 021 A1 | 6/1987 | Germany . |
| 31 44 963 C2 | 10/1992 | Germany . |
| 41 40 271 A1 | 6/1993 | Germany . |

*Primary Examiner*—Lee W. Young
*Attorney, Agent, or Firm*—Meltzer, Lippe, Goldstein et al.

[57] ABSTRACT

A pressure medium actuated braking system comprises at least first and second braking circuits, and a multi-circuit braking power imparting device, such as a motorcar brake valve. The first braking circuit assigned to, e.g., the rear axle, has a first pressure medium storage container, at least one braking cylinder, and a first control valve system which connects the braking cylinder to the first pressure medium storage container or to a pressure medium sink (atmosphere) depending on a first control signal produced by the motorcar brake valve. The second braking circuit, assigned to, e.g., the front axle, has a second pressure medium storage container, first and second braking cylinders, and a second control valve system which connects the first and second braking cylinders to the second pressure medium storage container or to a pressure medium sink depending on a second control signal generated by the motorcar brake valve. The second braking circuit also includes an additional control valve system disposed between a pressure medium output of the second control valve system and one of the brake cylinders of the second braking circuit. The additional control valve system can connect this braking cylinder to a third pressure medium storage container which is independent of the second pressure medium storage container in dependence on the first control signal.

24 Claims, 2 Drawing Sheets

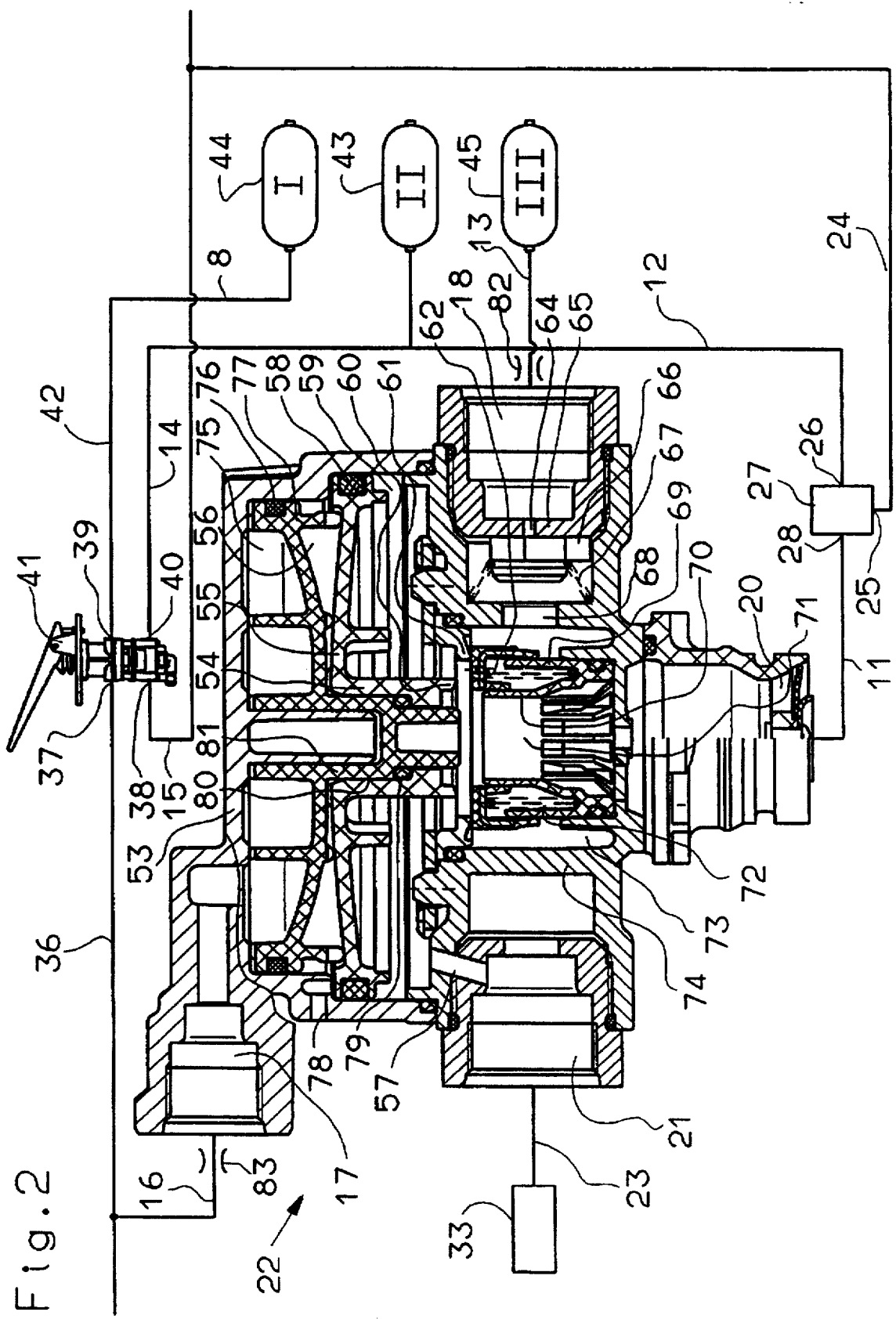

PRESSURE MEDIUM ACTUATED VEHICLE BRAKING SYSTEM

BACKGROUND OF THE INVENTION

The invention relates to a pressure-medium actuated vehicle braking system having separate braking circuits for the front and rear axles.

A braking system of this type is known from EP-A 0 079 543.

This known braking system comprises a dual circuit braking system wherein a relay valve system is assigned to the brake cylinders of the front axle as well as to the brake cylinders of the rear axle for the control of the braking pressure.

The division of the braking system into two braking circuits ensures, in case of the failure of one braking circuit, that the braking cylinders of the other braking circuit are still supplied with pressure medium, so that the vehicle can be decelerated with relative safety.

In case of failure of the braking circuit serving as the rear axle braking circuit, good deceleration of the vehicle is still achieved, since due to the dynamic axle load displacement during a braking event, approximately 70 to 80% of the braking force is produced by the wheels of the front axle of the vehicle.

However, if the braking circuit assigned to the wheels of the front axle of the vehicle fails, it may be difficult to reach the braking force that must be produced by the wheels of the rear axle of the vehicle as prescribed by law. This may occur particularly when the vehicle has a very low empty weight and a high admissible overall weight, since the wheels of the rear axle of the unloaded vehicle are not subjected, under unfavorable circumstances, to a force in the direction of the road surface which would ensure good deceleration of the vehicle.

It is therefore the object of the invention to provide a vehicle braking system actuated by a pressure medium of the type mentioned initially, and which is designed so that reliable deceleration of the vehicle is ensured even under unfavorable road and weight conditions for the vehicle, and even in case of a failure in one braking circuit of the vehicle.

SUMMARY OF THE INVENTION

In accordance with the present invention, a pressure medium actuated braking system comprises at least first and second braking circuits, and a multi-circuit braking power imparting device, such as a motorcar brake valve. The first braking circuit has a first pressure medium storage container assigned to it, at least one braking cylinder, and a first control valve system which connects the braking cylinder to the first pressure medium storage container or to a pressure medium sink in dependence on a first control signal produced by the motorcar brake valve. The second braking circuit has a second pressure medium storage container, first and second braking cylinders, and a second control valve system which connects the first and second braking cylinders to the second pressure medium storage container or to a pressure medium sink in dependence on a second control signal generated by the motorcar brake valve. The second braking circuit also includes an additional control valve system disposed between a pressure medium output of the second control valve system and one of the brake cylinders of the second braking circuit. The additional control valve system is capable of connecting this braking cylinder to a third pressure medium storage container which is independent of the second pressure medium storage container in dependence on a control signal produced by the motorcar brake valve which is assigned to a braking circuit other than the second braking circuit. Preferably, the control signal which switches the braking cylinder of the second braking circuit into connection with the third pressure medium storage container is the control signal assigned to the first braking circuit.

This invention offers the advantage of a vehicle braking system where, in case of a failure occurring in one of the two braking circuits, the supply of braking pressure to one of the two braking cylinders assigned to the failing braking circuit is still ensured. The pressure of the intact braking circuit or the pressure of a pressure medium source that is independent of the two braking circuits of the vehicle will serve as braking pressure for this one braking cylinder of the failing braking circuit.

To ensure the supply of braking pressure to one of the two brake cylinders on the vehicle axle serviced by the failing braking circuit, the additional control valve system is provided between this one braking cylinder and the control valve system which normally services both brake cylinders of this vehicle axle, it being possible to supply this brake cylinder with pressure from either the pressure medium source normally assigned to the failing braking circuit or with the pressure from a pressure medium source which is independent of the pressure medium source of this failing braking circuit.

The additional control valve system is switched into the pressure medium actuated vehicle braking system in such manner that its pressure medium outlet, which normally vents into the atmosphere, is connected to the pressure medium output of the control valve system serving to supply the two brake cylinders of this braking circuit. Also, the pressure medium input of the additional control valve system is connected to a pressure medium source which is independent of the pressure medium source serving to supply the two brake cylinders with pressure medium, e.g., it is connected to a pressure medium source of a third braking circuit of the vehicle which serves as a trailer braking circuit.

BRIEF DESCRIPTION OF THE DRAWINGS

An embodiment of the invention is explained below in further detail by reference to the drawings, wherein:

FIG. 2 shows the additional control valve system in an enlarged and sectional view.

DETAILED DESCRIPTION OF THE INVENTION

Figure 1:
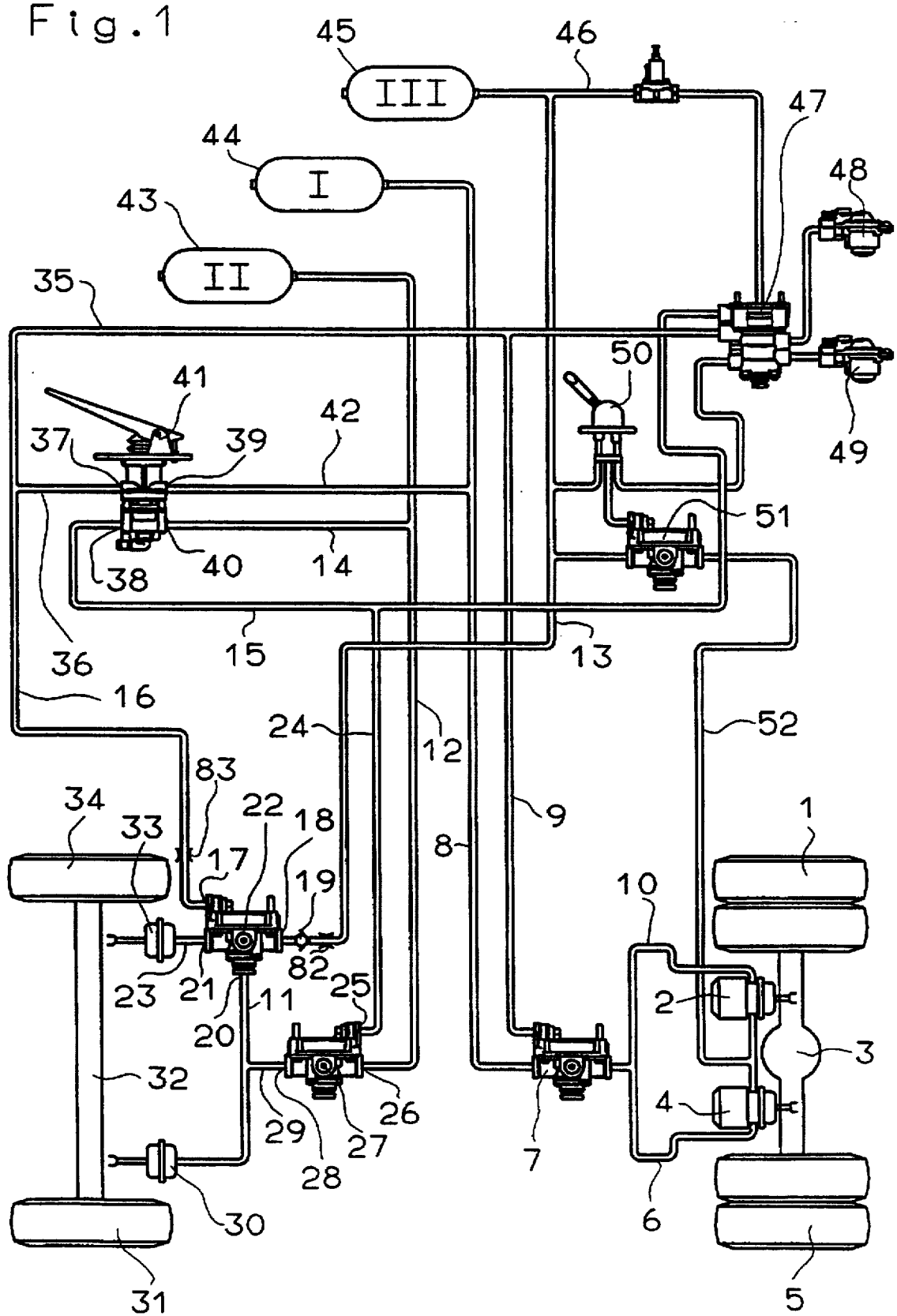
FIG. 1 schematically shows a pressure-medium-actuated vehicle braking system according to the invention.

FIG. 1 shows a three-circuit braking system for a two-axle vehicle, where the third circuit serves as a trailer braking system.

A first axle serving as rear axle (3) is provided with two wheels (1) and (5). The wheels (1) and (5) are assigned brake cylinders (2) and (4) in the form of spring brake cylinders. The two brake cylinders (2) and (4) are connected via pressure medium lines (6) and (10) to the output of a first control valve system (7). The input of the first control valve system (7) is connected via a pressure medium line (8) to a pressure medium storage container (44) serving as the pressure medium source for the supply of pressured medium to the brake cylinders (2) and (4). The control input of the first control valve system (7) is connected via pressure medium lines (9), (35) and (36) to a first pressure medium output (37) serving as a control output of a multi-circuit braking power imparter in the form of motorcar brake valve (41). A first pressure medium input (39) assigned to the motorcar brake valve (41) is connected via pressure medium line (42) and via pressure medium line (8) to the pressure medium storage container (44). The brake cylinders (2) and (4) of the rear axle (3), together with the pressure medium lines (6) and (10) of the first control valve system (7), the pressure medium lines (8), (9), (35) and (36), the motorcar brake valve (41) and the pressure medium line (42) as well as the pressure medium storage container (44) constitute a first braking circuit (I) of the vehicle braking system serving as a rear axle braking circuit.

A second axle of the vehicle which serves as a front axle (32) is provided with a first wheel (34) and a second wheel (31). The first wheel (34) is assigned a first brake cylinder (33) and the second wheel (31) is assigned a second brake cylinder (30). The second brake cylinder (30) is connected via pressure medium line (11) and via pressure medium line (29) connected to the latter to the pressure medium output (28) of a second control valve system (27). A pressure medium input (26) of the second control valve system (27) is connected via a pressure medium line (12) to a pressure medium storage container (43) which serves as a pressure medium source to supply the brake cylinders (33) and (30) of the front axle (32) of the vehicle. A control input (25) of the second control valve system (27) is connected via a pressure medium line (24) and a pressure medium line (15) which is connected to the latter to a second pressure medium output (38) used as a control output of the motorcar brake valve (41). A second pressure medium input (40) of the motorcar brake valve (41) associated with the second pressure medium output (38) is connected via the pressure medium line (14) and the pressure medium line (12) and also to the pressure medium storage container (43).

The first brake cylinder (33) of the front axle (32) is connected via a pressure medium line (23) and via an additional control valve system (22) and the pressure medium line (11) to the pressure medium output (28) of the second control valve system (27). The additional control valve system (22) is provided with a pressure medium input (18), a pressure medium output (21), a control input (17) and a pressure medium outlet (20) leading normally to a pressure medium sink (e.g., atmosphere).

The pressure medium input (18) of the additional control valve system (22) is connected via a pressure medium line (13) and a pressure medium line (46) connected to the latter to a pressure medium storage container (45). Two coupling heads (48) and (49) serving to connect the braking system of the motor vehicle to the braking system of a trailer vehicle are connected to the pressure medium storage container (45) via the pressure medium line (46) and a valve device (47).

The pressure medium outlet (20) and the additional control valve system (22) are connected via the pressure medium line (11) and the pressure medium line (29) to the pressure medium output (28) of the second control valve system (27). The pressure medium output (21) of the additional control valve system (22) is connected via pressure medium line (23) to the first brake cylinder (33) of the front axle (32). The control input (17) of the additional control valve system (22) is connected via the pressure medium line (16) and the pressure medium line (36) to the first pressure medium output (37) of the motorcar brake valve (41). A pressure medium input chamber of the additional control valve system (22) is connected via the pressure medium input (18) to the pressure medium storage container (45), and a pressure medium output chamber of the additional control valve system (22) is connected via the pressure medium outlet (20) and the second control valve system (27) to the pressure medium storage container (43).

In proximity to the pressure medium input (18) of the additional control valve system (22), a throttle (82) and a check valve (19), which can be placed in open position in the direction of the pressure medium input chamber of the additional control valve system (22) by the pressure medium of the pressure medium storage container (45), are provided in the pressure medium line (13) leading from the pressure medium input (18) to the pressure medium storage container (45). The check valve (19) serves to separate from each other the pressure medium storage container (43), serving to supply pressure medium to the two brake cylinders (33) and (30), and the pressure medium storage container (45). The check valve (19) is located between the pressure medium input (18) and the throttle (82). An additional throttle (83) is located in proximity to the control input (17) in the pressure medium line (16) leading from the first pressure medium output (37) of the motorcar brake valve (41) to the control input (17) of the additional control valve system (22). This throttle can also be installed directly in the control input (17), e.g., in the form of a diaphragm.

The two brake cylinders (33) and (30) of the front axle (32), the pressure medium lines (23), (11) and (29), the second control valve system (27) and the additional control valve system (22) as well as the pressure medium lines (24), (15), (16) and (36), the motorcar brake valve (41), the pressure medium line (14) and the pressure medium line (12) as well as the pressure medium storage container (43), together constitute a second braking circuit (II) serving as a front axle braking circuit for the pressure-medium actuated vehicle braking system.

The brake cylinders (2) and (4) of the rear axle (3) of the vehicle are connected via a pressure medium line (52) to the pressure medium output of a controllable valve (51) controlled by means of a hand brake valve (50). The pressure medium input of said controllable valve (51) and the pressure medium line (46) are connected to the pressure medium storage container (45). The hand brake valve (50) is furthermore connected to a pressure medium input of the valve device (47) which serves as a trailer control valve. The valve devices (47) and (50) and the coupling heads (48) and (49), as well as the appertaining pressure medium lines and the pressure medium storage container (45), constitute a third braking circuit (III) of the vehicle braking system serving as a trailer braking circuit.

The first control valve system (7), the second control valve system (27), and the additional control valve system (22) are of substantially identical construction and constitute commercially obtainable relay valves, wherein only the additional control valve system (22) is provided with a check valve (19) and, if desired, with the throttles (83) and (82). Therefore only the additional control valve system is described below in detail.

FIG. 2 shows a sectional view of the additional control valve system (22) associated with the first brake cylinder (33) of the front axle (32) of the vehicle. For the sake of clarity, like components and lines in FIG. 2 are given the same reference numbers as are used in FIG. 1.

The additional control valve system in the form of relay valve (22) is provided with a first relay piston (55) serving as a control piston and a second relay piston (77) serving as a second control piston. These pistons are located in housing

(35) one behind the other, are coaxial relative to each other, and are capable of movement in the direction of the longitudinal axis of housing (53). The second relay piston (77) has a smaller active surface than the active surface of the first relay piston (55), the term "active surface" referring to a surface which is subjected to a pressure medium. With its side away from the second relay piston (77), the first relay piston (55) delimits a pressure medium output chamber (59) and with its side towards the second relay piston (77) it delimits a control chamber (56) which is connected to the atmosphere via an opening (78) in the wall of housing (53).

The second relay piston (77) also delimits with its side towards the first relay piston (55) the control chamber (56), and delimits with its side away from the first relay piston (55) a second control chamber (75). On its circumference, the first relay piston (55) bears a sealing ring (58) which presses against the wall of housing (53). In a similar fashion, the second relay piston (77) bears on its circumference a sealing ring (76) which also presses against the wall of housing (53). The sealing rings (58) and (76) as well as the opening (78) prevent any exchange of pressure medium between the control chamber (75) and the pressure medium output chamber (59).

The second relay piston (77) is provided with an extension (81) which is centered and extends on the one hand in the direction of the control chamber (75) and on the other hand in the direction of the first relay piston (55). In the area of the extension (81) which extends towards the control chamber (75), a centered pocket bore is provided into which a peg-like projection of the housing (53) extends. The second relay piston (77) is thus slidingly supported on this peg-like projection of the housing (53).

Similarly, the first relay piston (55) is provided with a centered projection (54) with a centered stepped bore (80). The similarly stepped area of extension (81) of the second relay piston (77) extends into the stepped bore (80) of the first relay piston (55). The first relay piston (55) moves slidingly on the stepped area of the extension (81) of the second relay piston (77). A sealing ring (79) is installed between the sides of the stepped area of extension (81) of the second relay piston (77) and the stepped walls of the bore (80) in the first relay piston (55). The sealing ring (79) prevents pressure medium from escaping through the gap between the outer circumference of the extension (81) and the wall of projection (54) delimiting the bore (80) into the control chamber (56) from the pressure medium output chamber (59) and from escaping through opening (78) into the atmosphere.

A combined inlet and outlet valve (61, 62, 60) comprises a ring-shaped inlet valve seat (61) fixedly installed in the housing (53), a valve element (62) capable of movement relative to said inlet valve seat (61) and held by the force of a spring (72) at the inlet valve seat (61), and an outlet valve seat (60) formed by the free end of the centered projection (54) on the first relay piston (55). The projection (54) is coaxial with the inlet valve seat (61) and with the valve element (62), and is located on the first relay piston (55). Its free end zone, which forms the outlet valve seat (60), extends in the direction of the inlet valve seat (61) and the valve element (62). On the side of the valve element (62) away from the outlet valve seat (60) and coaxial with the valve element (62), a pipe-shaped body (unnumbered), with a forked portion (69, 70) is installed in the housing and extends with its forked portion in the direction of the valve element (62). The fork portion (69, 70) of the pipe-shaped body comprises an outer leg (69) and an inner leg (70) extending parallel to the longitudinal axis of the housing (53).

The valve element (62) is made in the form of a U-shaped body which is oriented in such manner relative to the fork-shaped portion (69, 70) of the pipe-shaped body that an inner leg of the valve element (62) is capable of sliding and sealed movement on the outer circumferential surface of the inner leg (70) of the pipe-shaped body. An outer leg of the valve element (62) is capable of similar movement on the outer circumferential surface of the outer leg (69) of the pipe-shaped body. The spring (72) bears with one of its ends upon the bottom of the forked portion (69, 70) of the pipe-shaped body and bears with its other end on the bottom of the U-shaped valve element (62). The free inner space of the pipe-shaped body constitutes the area (71) of the pressure medium outlet (71, 20) located within the housing (53) which is connected to an area (20) of the pressure medium outlet (71, 20) located outside the housing (53) and serving as a pressure medium connection.

The pressure medium input chamber (73) is delimited by the outer circumferential surface of the pipe-shaped body with the two legs. (69) and (70) and by a ring-shaped wall (74) of housing (53). A passage (68) is provided in the wall (74) connecting the pressure medium input chamber (73) to pressure medium input (18). The pressure medium outlet (71, 20) can be connected via outlet valve (62, 60) of the combined inlet and outlet valve (60, 61, 62) to the pressure medium output chamber (59).

The pressure medium input (18) is pot-shaped with a passage (64) provided in the bottom (65) of the pot-shaped portion part. A valve element (66) is installed between the side of wall (74) of housing (53) towards the pot-shaped portion of the pressure medium input (18) and the bottom (65) of the pot-shaped portion of the pressure medium input (18). This valve element (66) is held on the bottom (65) of the pot-shaped portion of the pressure medium input (18) by a spring (67) bearing upon the wall (74) in such fashion that it closes the passage (64). The pressure medium input (18) is connected via pressure medium line (13) to pressure medium storage container (45). The bottom (65), the passage (64), and the valve element (66) constitute a check valve (65, 64, 66) which is brought by the pressure medium of the pressure medium storage container (45) into the open position in the direction of the pressure medium input chamber (73). In proximity to the pressure medium input (18), a throttle (82) is installed in the pressure medium line (13). The throttle (82) can also be made in the form of a diaphragm, for example, and be installed directly in the pressure medium input (18).

The pressure medium output chamber (59) is connected via a passage (57) located in the wall of housing (53) which separates pressure medium output (21) from the pressure medium output chamber (59) to the pressure medium output (21). The pressure medium output (21) is connected via pressure medium line (23) to the first brake cylinder (33) of the front axle (32) of the vehicle.

The pressure medium outlet (20, 71) of the relay valve (22) which can be connected to the pressure medium output chamber (59) via the outlet valve (62, 60), is connected via pressure medium line (11) to pressure medium output (28) of the second control valve system (27), as explained with reference to FIG. 1. Pressure medium input (26) of the second control valve system (27) is connected via pressure medium line (12) to pressure medium storage container (43). Control input (25) of the second control valve system (27) is connected via pressure medium lines (24) and (15) to the second pressure medium output (38) of motorcar brake valve (41). The second pressure medium input (40) of the motorcar brake valve (41), which can be connected to the second pressure medium output (38) of the second control valve system (27), is connected via pressure medium line (14) to the pressure medium storage container (43). The second control chamber (75) of the relay valve (22) is connected to control input (17) which is connected via pressure medium line (16) and pressure medium line (36) to the first pressure medium output (37) of the motorcar brake valve (41). Throttle (83) is located in the pressure medium line (16) in proximity to the control input (17). The throttle (83) can also be made in the form of a diaphragm, for example, and be located directly within the control input (17). The first pressure medium input (39) of the motorcar brake valve (41) which can be connected to the first pressure medium output (37) is connected via pressure medium line (42) and pressure medium line (8) to the additional pressure medium storage container (44).

The control chamber (75) of the relay valve (22) can thus be supplied with pressure serving as a control signal for the first (rear axle) braking circuit (I) which is transmitted by the motorcar brake valve (41) via its first pressure medium output (37). The pressure medium output chamber (59) can be supplied with pressure from pressure medium storage container (43) allocated to the second (front axle) braking circuit (II) via the open outlet valve (60, 62)—while the inlet valve (61, 62) is closed—of the combined inlet and outlet valve (60, 61, 62). Pressure medium outlet (20, 71) of the additional control valve system (22) and the second control valve system (27) can be supplied with the pressure of the pressure medium storage container (45) of the third (trailer) braking circuit (III), which is independent from the pressure medium storage container (43) of the second braking circuit, via the open inlet valve (61, 62)—while the outlet valve (60, 62) is closed—of the combined inlet and outlet valve (60, 61, 62) and via the pressure medium input chamber (73) and the pressure medium input (18) of the relay valve (22). The pressure decrease in the pressure medium output chamber (59) of the relay valve (22), and thereby also the pressure decrease in the first brake cylinder (33) connected to it, takes place via the open outlet valve (60, 62)—while the inlet valve (61, 62) is closed—of the combined inlet and outlet valve (60, 61, 62) and via the pressure medium outlet (71, 20) of the relay valve (22) and the second control valve system (27).

The operation of the relay valve described above in the pressure-medium actuated vehicle brake system will now be explained in further detail within the framework of operation of the overall vehicle braking system.

When the motorcar brake valve (41) is not actuated, the additional control valve system (22) in the form of a relay valve is in the switching position shown in FIG. 2. The inlet valve (61, 62) is closed and the outlet valve (62, 60) is open. There is no pressure in the control chamber (75). Pressure medium from the pressure medium storage container (45) of the third braking circuit (III) is present in the pressure medium input chamber (73). The pressure medium output chamber (59) is shut off by means of the inlet valve (61, 62) from the pressure medium input chamber (73) and is connected via the outlet valve (62, 60), the pressure medium outlet (71, 20), the pressure medium line (11) and the open outlet valve of the second control valve system (27) to the pressure medium sink (atmosphere). The first brake cylinder (33) connected to the pressure medium output (21) of the additional control valve system (22) and the second brake cylinder (30) of the front axle (32) connected via the pressure medium lines (11) and (29) to the pressure medium output (28) of the second control valve system (27) are thus also connected via the outlet valve of the second control valve system (27) to the pressure medium sink (atmosphere). At the pressure medium input (26) of the second control valve system (27), pressure medium from the pressure medium storage container (43) of the second braking circuit (II) is present. The pressure medium input (26) and the pressure medium output (28) of the second control valve system (27) are shut off from each other by means of an inlet valve of the second control valve system (27) in closed position.

In the same manner, pressure medium from the pressure medium storage container (44) of the first (rear axle) braking circuit is present in the pressure medium input chamber of the first control valve system (7). The pressure medium output chamber and the pressure medium input chamber of the first control valve system (7) are shut off from each other by means of an inlet valve, and the pressure medium output chamber is connected via an outlet valve to the pressure medium sink (atmosphere). Thus, the brake cylinders (2) and (4) of the rear axle (3) connected to the pressure medium output of the first control valve system (7) are also connected to the pressure medium sink (atmosphere). The control chamber of the first control valve system (7) is not under pressure. At the first pressure medium input (39) of the motorcar brake valve (41), the pressure medium from the pressure medium storage container (44) of the first braking circuit (I) is present, and at the second pressure medium input (40) of the motorcar brake valve (41), pressure medium from the pressure medium storage container (43) of the second braking circuit (II) is present. The two pressure medium outputs (37) and (38) of the motorcar brake valve (41) which serve as control outputs are shut off from the pressure medium inputs (39) and (40) associated with them by means of valve systems of the motorcar brake valve (41).

When the motorcar brake valve (41) is actuated in order to initiate a braking event, the valve systems of the motorcar brake valve (41) are switched over in such manner that the pressure medium outputs (37) and (38) of the motorcar brake valve (41) are connected to their associated pressure medium inputs (39) and (40) respectively.

Control pressure used as a control signal of the first braking circuit (I) is transmitted from the motorcar brake valve (41) via its first pressure medium output (37) into the control chamber of the first control valve system (7) and into the control chamber (75) of the additional control valve system (22).

At the same time, control pressure used as a control signal for the second braking circuit (II), goes from the second pressure medium output (38) of the motorcar brake valve (41) into the control chamber of the second control valve system (27). The first control valve system (7) and the second control valve system (27) switch over in such manner that the pressure medium output chamber of the first control valve system (7) is shut off from the pressure medium sink and is connected to its assigned pressure medium input chamber. The pressure medium output chamber of the second control valve system (27) is also shut off in the same manner from the pressure medium sink and is connected to its assigned pressure medium input chamber.

The brake cylinders (2) and (4) of the rear axle (3) are then supplied with the pressure released by the first control valve system (7), said pressure being dependent upon the control pressure for the first braking circuit (I), until the first control valve system (7) has reached a terminal position (inlet and outlet valve closed).

Pressure which depends on the control pressure of the second braking circuit (II) and is released by the second control valve system (27) goes through the pressure medium lines (29) and (11) and enters directly the second brake cylinder (30) of the front axle (32). This pressure, through the pressure medium outlet (71, 20) serving as an additional pressure medium input, also reaches the open outlet valve (60, 62), the pressure medium output chamber (59), the passage (57) and the pressure medium output (21) of the additional control valve system (22) as well as the pressure medium line (23) in the first brake cylinder (33) of the front axle (32). Pressure is injected into the two brake cylinders (33) and (30) by the second control valve system (27) until said second control valve system (27) has reached a terminal position (inlet and outlet valve closed).

The pressure medium input chamber (73) and the pressure medium output chamber (59) of the additional control valve system (22) are always shut off from each other by means of the closed inlet valve (61, 62) of the additional control valve system (22) when the second braking circuit (II) is intact.

Since the active surface of the second relay piston (77) of the additional control valve system (22) which is subjected to the control pressure in the control chamber (75) is smaller than the opposing active surface of the first relay piston (55) which is subjected to pressure in the pressure medium output chamber (59), the force exerted by the control pressure upon the second relay piston (77) cannot overcome this force of the pressure in the pressure medium output chamber (59) opposing it which is exerted upon the first relay piston (55). Thus, the second relay piston (77) pressing against the first relay piston (55) cannot push the first relay piston (55) in the direction of the combined inlet and outlet valve (60, 61, 62). An actuation of the combined inlet and outlet valve (60, 61, 62) by means of the two relay pistons (55) and (77) is not possible in the presence of pressure injected through the pressure medium outlet (20) into the pressure medium output chamber (59). The outlet valve (60, 62) remains open, and the inlet valve (61, 62) remains closed.

The control pressure for the first braking circuit (I) and also the pressure from the pressure medium storage container (45) of the third (trailer) braking circuit (III) which is present in the pressure medium input chamber (73) of the additional control valve system (22) have no influence on the pressure buildup or pressure drop in the first brake cylinder (33) of the front axle (32) when the second (front) braking circuit (II) is intact. Since the pressure buildup in the control chamber (75) of the additional control valve system (22) is slower, because of the throttle (83), than the pressure buildup in the pressure medium output chamber (59) of the additional control valve system (22), an unintended actuation of the combined inlet and outlet valve (60, 61, 62) by means of the relay pistons (55) and (77) is also excluded at the beginning of the pressure injection. The placement of the throttle (82) in front of the pressure medium input (18) makes it possible for the pressure buildup in the pressure medium input chamber (73) of the additional control valve system (22) to take place by priority with the pressure of the second braking circuit (II) injected via the other pressure medium outlet (20).

If the braking process is to be terminated, the motorcar brake valve (41) is brought back into its starting position. The connections between the pressure medium storage container (44) of the first braking circuit (I) to the control chamber (75) of the additional control valve system (22) and the control chamber of the first control valve system (7), and the connection between the pressure medium storage container (43) of the second braking circuit (II) to the control chamber of the second control valve system (27), are interrupted. The control chamber (75) of the additional control valve system (22), the control chamber of the second control valve system (27), and the control chamber of the first control valve system (7) are depressurized via the motorcar brake valve (41) into the atmosphere. The pressure drop which then occurs in the control chambers of the control valve systems causes the outlet valve of the first control valve system (7) and the outlet valve of the second control valve system (27) to go into their open positions. The pressure medium output chamber (59) of the additional control valve system (22) and thereby also the first brake cylinder (33) of the front axle (32) are then vented into the atmosphere via the open outlet valve (60, 62) and the pressure medium outlet (71, 20) of the additional control valve system (22), and via the open outlet valve of the second control valve system (27) which is connected to the additional control valve system (22). At the same time, the second brake cylinder (30) of the front axle (32) is depressurized via the second control valve system (27). The brake cylinders (2) and (4) of the rear axle (3) of the vehicle are vented via the first control valve system (7).

If a defect occurs in the second braking circuit (II), e.g., rupture of one of the pressure medium lines (15, 12, 29 or 11), either the second control valve system (27) can no longer be actuated by actuating the motorcar brake valve (41), or pressure medium from the pressure medium storage container (43) of the second braking circuit (II) escapes through the second control valve system (27). Pressure medium in the defective pressure medium line possibly also escapes into the atmosphere. In such case, no pressure medium can go from the pressure medium storage container (43) of the second braking circuit (II) into the second brake cylinder (30) of the front axle (32) and into the pressure medium output chamber (59) of the additional control valve system (22). The pressure which builds up in the control chamber (75) of the additional control valve system (22) when the motorcar brake valve (41) is actuated (control signal for the first braking circuit (I)), pushes the second relay piston (77) of the additional control valve system (22) down in the direction of the combined inlet and outlet valve (61, 60, 62). Since the first relay piston (55) is located between the combined inlet and outlet valve (61, 60, 62) and the second relay piston (55), the first relay piston (77) is taken along by the second relay piston (77) in the direction of the combined inlet and outlet valve (61, 60, 62). The outlet valve seat (60) of the outlet valve (62, 60) sits on the valve element (62). The outlet valve (62, 60) is then closed. As the relay pistons (55) and (77) continue to move downward, the valve element (62) is lifted up from the inlet valve seat (61). The inlet valve (61, 62) is then open. Pressure medium flows from the pressure medium storage container (45) of the third braking circuit (III) through the open inlet valve (61, 62) into the pressure medium output chamber (59) and from there on through the passage (57) into the pressure medium output (21). A pressure dependent on the pressure at the first pressure medium output (37) serving as the control output of a multi-circuit braking power imparter in the form of a motorcar brake valve (41) is then released by the additional control valve system (22) out of the third braking circuit (III). The pressure medium goes from the pressure medium output (21) through the pressure medium line (23) to the first brake cylinder (33) of wheel (34) of the vehicle front axle (32). The pressure building up in the pressure medium output chamber (59) causes the first relay piston (55) and thereby also the second relay piston (77) to move against the force of the control pressure in the control chamber (75) in the direction of the control chamber (75). When equality is reached between the force exerted by the control pressure in the control chamber (75) upon the second relay piston (77) and through the latter upon the first relay piston (55) and the opposing force exerted by pressure in the pressure medium output chamber (59) upon the first relay piston (55) and through the latter upon the second relay piston (77), the inlet valve (62, 60) reaches its closed position and a terminal position is reached.

If the motorcar brake valve (41) is placed in its starting position to end the braking process, the connection between the control chamber (75) of the additional control valve system (22) and the pressure medium storage container (44) of the first braking circuit (I) is interrupted by the motorcar brake valve (41). The control chamber (75) is aerated through the motorcar brake valve (41) into the atmosphere. The pressure difference between the pressure in the control chamber (75) and the pressure in the pressure medium output chamber (59) which then occurs causes the relay pistons (55) and (77) to be shifted by the pressure in the control chamber (75) further in the direction of the control chamber (56). In this process the outlet valve seat (60) of the combined inlet and outlet valve (60, 61, 62) lifts off from the valve element (62). The outlet valve (60, 62) is then open. The pressure is released via the open outlet valve (60, 62) and the open outlet valve of the second control valve system (27) or a possible break in the pressure medium line (11) from the pressure medium output chamber (59) into the atmosphere. At the same time the first brake cylinder (33) of the front axle (32) is also depressurized through the pressure medium output chamber (59) of the additional control valve system (22).

The inventive arrangement, wherein an additional control valve system is provided in a branch of the pressure medium lines, which additional control valve system connects the pressure medium output of a control valve system assigned to the brake cylinders of the front axle of a vehicle to the two brake cylinders of the front axle, ensures that in case of failure of the front axle braking circuit (second braking circuit II), at least one wheel of the front axle of the vehicle can still be braked.

The design and arrangement of the check valve provided in the pressure medium input of the additional control valve system is not restricted to the embodiment described herein. It is significant that when the pressure drops at the pressure medium input, the pressure medium input chamber of the additional control valve system is shut off from this pressure medium input.

It is mentioned in the description that the brake cylinders can be connected via associated control valve systems to a pressure medium source or to a pressure medium sink. This also means that additional control valves, e.g., ABS regulating valves which also have an outlet valve through which the associated brake cylinder can be connected to a pressure sink, can be inserted into the pressure medium lines going from the control valve systems to the brake cylinders. The atmosphere is considered to be the pressure medium sink for pneumatically run installations. In case of a hydraulic installation, the pressure medium sink can be a sump. The pressure medium operated vehicle brake system described herein can be a pneumatically actuated vehicle braking system as well as a hydraulically actuated one, or a combined hydraulic-pneumatic vehicle braking system.

The additional control valve system (22) may be equipped with two relay pistons (55) and (77) whose active surfaces subjected to pressure medium are of different size, as described herein. Within the framework of the invention, it is also possible to provide only one relay piston and to make it in the form of a differential piston, in which case a sealing ring must be provided on the circumference of the area with the large diameter and another one on the circumference of the area with the smaller diameter. The differential piston must then be placed in the housing of the additional valve system in such manner that its surface with the smaller diameter delimits the control chamber. This ensures that the relay piston or pistons cannot actuate the combined inlet and outlet valve of the additional control valve system when at the same time control pressure medium is present in the control chamber and pressure medium brought in through the pressure medium outlet is present in the pressure medium outlet chamber. However, when it is certain that the pressure brought through the pressure medium outlet of the pressure medium outlet chamber will not be greater than the pressure in the control chamber, the active surfaces of the relay piston or pistons subjected to the pressure medium can also be of identical size. To ensure that the pressure medium in the control camber and the pressure medium in the pressure medium output chamber cannot mingle, either two relay pistons, each provided with a sealing ring, or one relay piston with two seals must be provided, whereby the space between the two sealing rings must be connected to a pressure medium sink.

The vehicle braking system according to the invention can be controlled pneumatically, hydraulically or also electrically.

If the vehicle braking system is controlled at least in part electrically, the multi-circuit braking power imparting device must be provided with at least one electrical device, such as a potentiometer, and with at least one electrical control output, whereby the electrical output of the multi-circuit braking power imparting device must then be connected to an electrical control input of an electrically controlled control valve system assigned to at least one brake cylinder.

An electrical signal dependent on the position of the actuating element (pedal) of the multi-circuit braking power imparting device, for example, may be used as the electrical control signal for the control of the braking pressure.

The control valve system can then be provided with a proportional solenoid valve, for example, as the electrical control device. Of course it is also possible to make the control valve system or systems in the form of a pressure modulator or modulators which can be triggered by electrical control signals of the multi-circuit braking power imparting device.

According to the embodiment described herein, the multi-circuit braking power imparting device is made in the form of a motorcar braking valve for a motor vehicle, whereby a pneumatic control signal associated with a first braking circuit (rear axle braking circuit) and a pneumatic control signal associated with a second braking circuit (front axle braking circuit) are produced by this motorcar braking valve. The three control valve systems are designed in the embodiment described herein in the form of pneumatically controlled control valve systems.

The application of the invention must of course not be limited only to the brakes of the front axle of a vehicle. The invention can find application in brakes of rear axles or brakes of additional axles of the vehicle.

While the invention has been described by reference to a specific embodiment, this was done for purposes of illustration only. Numerous alternatives will be apparent to those skilled in the art and are considered to be within the scope of the invention.

We claim:

1. Pressure medium actuated braking system, comprising:

a braking power imparting device, at least first and second braking circuits, said first braking circuit comprising a first pressure medium storage container, at least a first braking cylinder, and a first control valve system which connects said first braking cylinder of said first braking circuit to said first pressure medium storage container or to a pressure medium sink in dependence on a first control signal produced by said braking power imparting device, said second braking circuit comprising a second pressure medium storage container, first and second braking cylinders, and a second control valve system which connects said first and second braking cylinders of said second braking circuit to said second pressure medium storage container or to a pressure medium sink in dependence on a second control signal produced by said braking power imparting device, said second control valve system further comprising a pressure medium input connected to said second pressure medium storage container, and a pressure medium output connected to said first and second brake cylinders of said second braking circuit, and an additional control valve system disposed between said pressure medium output of said second control valve system and said first braking cylinder of said second braking circuit, said additional control valve system connecting said first braking cylinder of said second braking circuit to a third pressure medium storage container which is independent of said second pressure medium storage container as a function of a control signal assigned to a braking circuit other than said second control signal assigned to said second braking circuit.

2. The braking system of claim 1 wherein said additional control valve system connects said first braking cylinder of said second braking circuit to said third pressure medium storage container as a function of said first control signal produced by said braking power imparting device.

3. The braking system of claim 1 wherein said third pressure medium storage container supplies pressure medium to a third braking circuit.

4. The braking system of claim 1 wherein said first pressure medium storage container is independent of said second pressure medium storage container.

5. The braking system of claim 1 wherein said first and second control signals are pneumatic control signals.

6. The braking system of claim 1 wherein said first and second control signals are electrical control signals.

7. The braking system of claim 1 wherein said braking power imparting device comprises a motorcar brake valve having a first pressure medium input, a second pressure medium input, and first and second pressure medium outputs associated with said first and second pressure medium inputs respectively, said first and second pressure medium inputs of said motorcar brake valve being connected to said first and second pressure medium storage containers, respectively, each of said first, second and additional control valve systems being pneumatically controlled and having a control input, said second pressure medium output of said motorcar brake valve being assigned to said second braking circuit and being connected to the control input of said second control valve system, and said first pressure medium output of said motorcar brake valve being assigned to said first braking circuit and being connected to the control input of said first control valve system and to the control input of said additional control valve system.

8. The braking system of claim 7 wherein said additional control valve system comprises a pressure medium input chamber, a pressure medium output chamber, a pressure medium outlet connectable by an outlet valve of said additional control valve system to said pressure medium output chamber of said additional control valve system, and a control chamber delimited by a relay piston device.

9. The braking system of claim 8 wherein said pressure medium input chamber of said additional control valve system is connected to said third pressure medium storage container, and wherein a check valve is disposed between said pressure medium input chamber of said additional control valve system, and said third pressure medium storage container to shut off said second and third pressure medium storage containers from each other.

10. The braking system of claim 9 wherein said pressure medium output chamber of said additional control valve system is connected to said first brake cylinder of said second braking circuit.

11. The braking system of claim 10 wherein said pressure medium output of said additional control valve system is connected to the pressure medium output of said second control valve system.

12. The braking system of claim 11 wherein said control chamber of said additional control valve system is connectable to said first pressure medium storage container via said motorcar brake valve.

13. The braking system of claim 12 wherein said control chamber of said additional control valve system is connectable to said first pressure medium storage container via a solenoid valve system located upstream of said control chamber of said additional control valve system.

14. The braking system of claim 12 wherein said second control valve system comprises a pressure medium input chamber connected to said pressure medium input of said second control valve system, a pressure medium output chamber connected to said pressure medium output of said second control valve system, a control chamber delimited by a control piston, and a combined inlet/outlet valve system actuated by said control piston through which the pressure medium output chamber of said second control valve system can be connected to or shut off from the pressure medium input chamber of said second control valve system depending on the position of said control piston.

15. The braking system of claim 12 wherein said pressure medium input of said second control valve system is connected to the second pressure medium storage container.

16. The braking system of claim 15 wherein said pressure medium output of said second control valve system is connected to said second braking cylinder of said second braking circuit and to said pressure medium outlet of said additional control valve system.

17. The braking system of claim 14 wherein said control chamber of said second control valve system can be connected via said motorcar brake valve to said second pressure medium storage container.

18. The braking system of claim 14 wherein said control chamber of said second control valve system can be connected via a solenoid valve system to said second pressure medium storage container.

19. The braking system of claim 8 wherein said pressure medium input chamber of said additional control valve system is connected to a pressure medium input of said additional control valve system, said pressure medium output chamber of said additional control valve system is connected to a pressure medium output of said additional control valve system, and said control chamber of said additional control valve system is connected to said control input and said pressure medium outlet of said additional control valve system.

20. The braking system of claim 19 wherein said pressure medium input of said additional control valve system is connected to said third pressure medium storage container, said pressure medium output chamber of said additional control valve system is selectively connectable to said pressure medium input chamber of said additional control valve system or to said pressure medium output of said second control valve system via said outlet valve of a combined inlet/outlet valve system of said additional control valve system, said control chamber of said additional control valve system is connectable via said motorcar brake valve to said first pressure medium storage container, and said pressure medium output of said additional control valve system is connected to said first brake cylinder of said second braking circuit.

21. The braking system of claim 20 wherein said pressure medium input of said second control valve system is connected to said second pressure medium storage container and said control input of said second control valve system is connectable via said motorcar braking valve to said second pressure medium storage container.

22. The braking system of claim 21 wherein an active surface of said relay piston device of said additional control valve system subjected to control pressure in said control chamber of said additional control valve system is at most equal in area to an active surface of said relay piston device subjected to pressure in said pressure medium output chamber of said additional control valve system in an opposite direction.

23. The braking system of claim 22 wherein said relay piston device comprises a differential piston.

24. The braking system of claim 8 wherein said relay piston device comprises a first relay piston and a second relay piston coaxial with each other and disposed one behind the other in a housing of said additional control valve system, said first relay piston delimiting the pressure medium output chamber of said additional control valve system with a side away from said second relay piston, and said second relay piston delimiting said control chamber of said additional control valve system with a side away from said first relay piston, said first and second relay pistons being configured so that when said first relay piston moves in a direction away from said pressure medium output chamber of said additional control valve system, said second relay piston is slaved in the same direction by said first relay piston, and when said second relay piston moves in a direction away from said control chamber of said additional control valve system, said first relay piston is slaved in the same direction by said second relay piston.

* * * * *